United States Patent [19]

Weideman et al.

[11] Patent Number: 5,146,512
[45] Date of Patent: Sep. 8, 1992

[54] METHOD AND APPARATUS FOR UTILIZING MULTIPLE DATA FIELDS FOR CHARACTER RECOGNITION

[75] Inventors: William E. Weideman, Arlington, Tex.; Carl G. O'Connor, Arlington, Va.

[73] Assignee: Recognition Equipment Incorporated, Irving, Tex.

[21] Appl. No.: 655,085

[22] Filed: Feb. 14, 1991

[51] Int. Cl.⁵ .............................................. G06K 9/62
[52] U.S. Cl. ............................................ 382/30; 382/7; 382/34
[58] Field of Search ................ 382/7, 9, 30, 34, 40, 382/48; 235/379, 454

[56] References Cited

U.S. PATENT DOCUMENTS

| | | | |
|---|---|---|---|
| 3,766,520 | 10/1973 | Patterson | 382/21 |
| 3,842,402 | 10/1974 | Ett et al. | 382/40 |
| 3,949,363 | 4/1976 | Holm | 382/7 |
| 4,020,463 | 4/1977 | Himmel | 382/56 |
| 4,028,674 | 6/1977 | Chuang | 382/3 |
| 4,201,978 | 5/1980 | Nally | 382/7 |
| 4,417,136 | 11/1983 | Rushby et al. | 235/379 |
| 4,442,541 | 4/1984 | Finkel et al. | 382/7 |
| 4,524,453 | 6/1985 | Egami et al. | 382/40 |
| 4,563,771 | 1/1986 | Gorgone et al. | 382/7 |
| 4,754,489 | 6/1988 | Bokser | 382/40 |
| 4,764,973 | 8/1988 | O'Hair | 382/14 |
| 4,773,099 | 9/1988 | Bokser | 382/14 |

Primary Examiner—Jose Couso
Attorney, Agent, or Firm—Ross, Howison, Clapp & Korn

[57] ABSTRACT

A system (10) for recognizing numerical characters which appear as both numerical characters and words on a document includes an image capture device (12) for capturing the image of a document. A recognition circuit (14) performs recognition of the numerical characters. A recognition circuit (16) performs recognition of the words corresponding to the numerical characters. A comparator circuit (20) compares the recognition signals generated by the recognition circuit (16) to the recognition signals generated by the recognition circuit (14) to determine if the numerical characters recognized by the recognition circuit (14) is correct.

8 Claims, 2 Drawing Sheets

METHOD AND APPARATUS FOR UTILIZING MULTIPLE DATA FIELDS FOR CHARACTER RECOGNITION

TECHNICAL FIELD OF THE INVENTION

This invention relates to character recognition systems, and more particularly to a system for recognizing a numerical character phrase based upon the recognition and comparison of words corresponding to or associated with the numerical character phrase to the recognition of the numerical character phrase.

BACKGROUND OF THE INVENTION

The processing of documents such as for example, bank checks, includes the sorting, distribution, and proving of all deposit transactions arising from the commercial operations of a bank. The sorting of checks includes separating the checks in accordance with the bank the check is drawn on. Further processing of bank checks includes the imprinting of the transaction amount of the check directly on the check for confirming such amount. Modern document processing systems provide for the listing and balancing of amounts for use in proving the documents, encoding information on the checks for use in distributing the checks, endorsing, microfilming, sorting, and distributing the checks in accordance with their final destination. Magnetic printing and readers have been employed, together with optical character recognition devices for processing bank checks to reduce processing costs as well as for reducing errors during processing.

Typically, bank checks processed utilizing present technology require manual encoding of the transaction amount of the check in magnetic ink on the check. Various systems have been proposed for reading handwritten characters of the courtesy amount field on a bank check. While such recognition systems generally have proved to be workable, the variations in the handwritten characters of all customers of a bank result in high recognition error rates and therefore, the manual encoding of such transaction amounts is frequently done resulting in lower recognition error rates.

A need has thus arisen for the method and apparatus for reducing the costs of processing certain documents such as, for example, bank checks in which the handwritten transaction amount can be automatically read at low recognition error rates for subsequent processing of the document.

SUMMARY OF THE INVENTION

In accordance with one aspect of the present invention, a method for recognizing numerical characters which appear in both numerical characters and corresponding or associated words on a document includes the step of capturing the image of the document. The numerical characters are identified in addition to the words corresponding to the numerical characters. A comparison is made between the identification of words and the identification of the numerical characters to determine if the identification of the numerical characters is accurate.

In accordance with another aspect of the present invention, a system for recognizing numerical characters which appears as both numerical characters and words on a document is provided. Structure is provided for capturing the image of the document. Recognition circuitry is provided for recognizing the numerical characters and for generating a first recognition signal. A second recognition circuit recognizes the words representing or associated with the numerical characters and generates a second recognition signal. Circuitry receives the first and second recognition signals for performing a comparison to determine if the first recognition signal is correct.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

The present invention is applicable to the processing of documents in which a numerical character such as, for example, a transaction amount, appears in both numerical characters and written words. Such documents include, for example, a bank check in which the transaction amount appears in a numerical character field and as a word phrase corresponding to the numerical character field. The numerical character field is typically referred to as the courtesy amount field and is generally located at the end of the payee line on a bank check. The word phrase or alphabetical field corresponding to the numerical character field is typically referred to as the legal amount field and appears on the line below the payee line on a bank check. The present invention performs the recognition of both the courtesy amount field and the legal amount field and utilizes the legal amount field recognition to verify the recognition of the numerical character field.

The present invention can also be utilized for performing the recognition of any numerical character where there is an associated word phrase or alphabetical character associated therewith. For example, the numerical character field may include a manufacturer's part number and the alphabetical character field may include a written part description. Similarly, the numerical character field may comprise a person's social security number with the alphabetical character field representing the person's name. Conversely, the present invention can also be utilized for performing the recognition of the words associated with a numerical character field. As used throughout this description, "numerical character field" will refer to numbers such as for example, a transaction amount of the courtesy amount field on a bank check which is to be recognized by a document processing system. The term "alphabetical field" will represent either the corresponding words associated with a numerical character such as, for example, the legal amount field of a bank check or words associated with a numerical character such as, for example, a person's name associated with a social security number. Through the use of the present system and method, the error rate, the undetected misclassification rate of a numerical character, is reduced.

Figure 1:
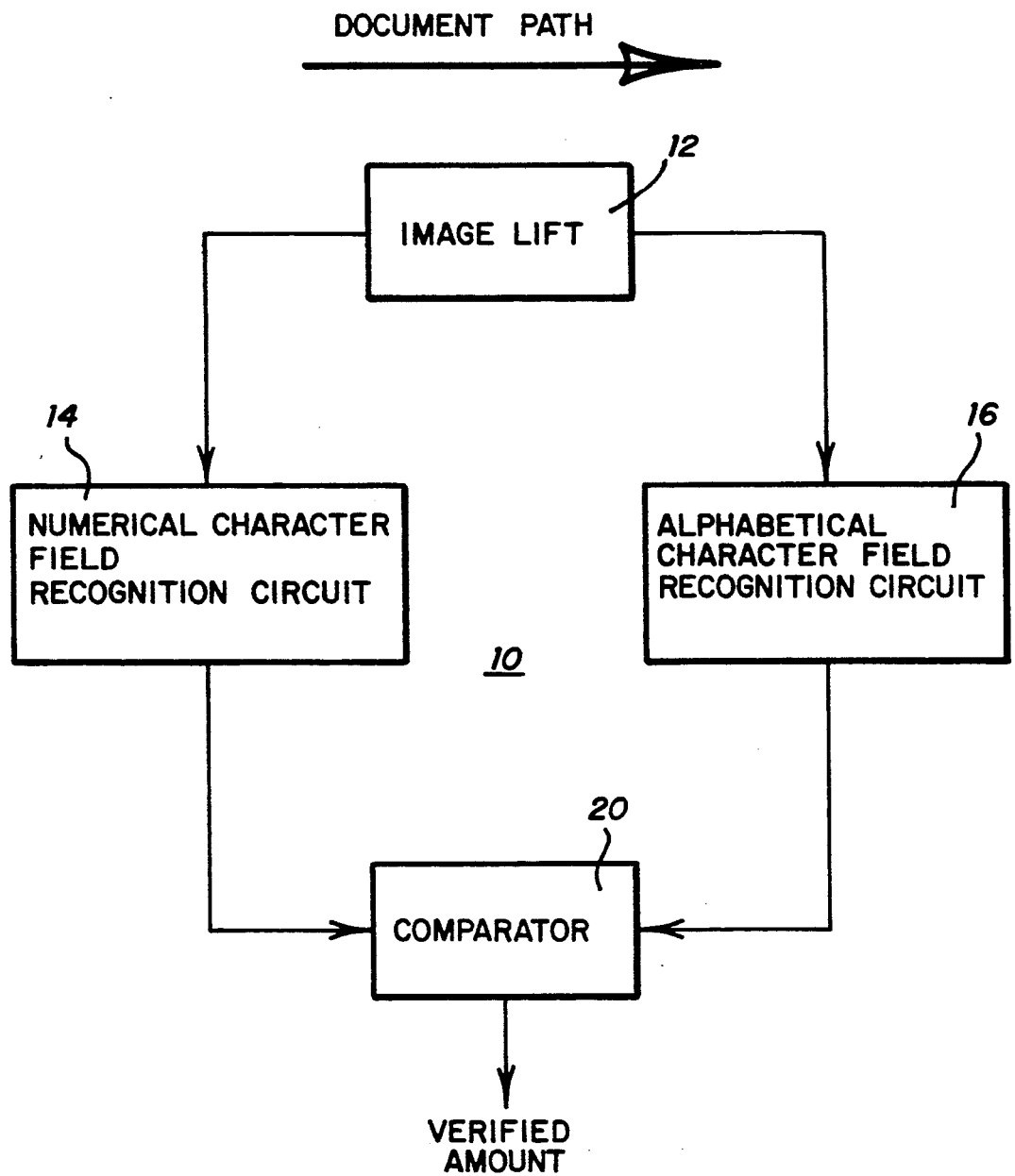
FIG. 1 is a block diagram of the present character recognition system.

Referring to FIG. 1, the present numerical character recognition system is illustrated in block diagram form, and is generally identified by the numeral 10. Numerical character recognition system 10 includes an image lift 12 for capturing the entire image of a document or portions of a document such as, for example, a bank check. Image lift 12 captures the image at a sufficient sample density such as, for example, 300 points per inch so that recognition of both the numerical character field and alphabetical character field can be performed from the same image. The output of image lift 12 is applied to a numerical character field recognition circuit 14 and an alphabetical character field recognition circuit 16. Numerical character field recognition circuit 14 containing, for example, a courtesy amount, generates signals representing the numerical characters appearing in the courtesy amount field. Alphabetical character field recognition circuit 16 generates signals representing the number corresponding to the word phrase appearing in the legal amount field on a bank check. The output of numerical character field recognition circuit 14 and alphabetical character field recognition circuit 16 is applied to a comparator 20 which generates an output signal corresponding to the numerical characters appearing on the document. The redundant recognition performed by alphabetical character field recognition circuit 16 is used by comparator 20 for verifying the recognition performed by numerical character field recognition circuit 14 utilizing the characters appearing in the courtesy amount field.

Numerical character field recognition circuit 14 may include, for example, the system described in U.S. Pat. Nos. 4,201,978 and 3,766,520 which descriptions are incorporated herein by reference. Alphabetical character field recognition circuit 16 may comprise for example, the hand print recognition systems described in U.S. Pat. Nos. 4,028,674 and 4,020,463, which descriptions are incorporated herein by reference.

Figure 2:
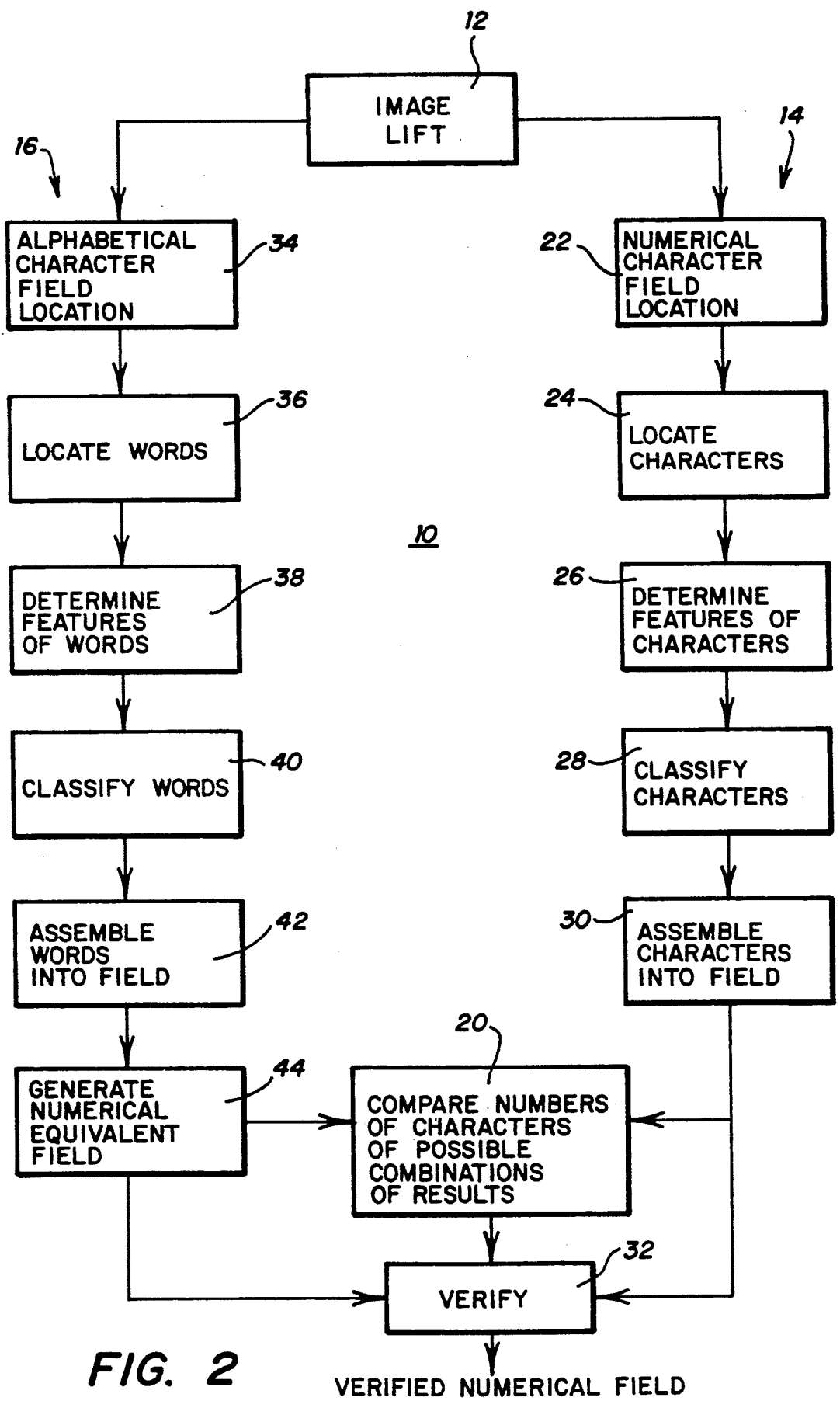
FIG. 2 is a flow chart of the operation of the present system.

The process of the present invention will now be described with respect to FIG. 2. Once the image of the document has been captured, this image is analyzed to locate the numerical character field location at block 22. Information used to locate the numerical character field includes the individual document format definition as well as recognition of various attributes such as for example, the dollar sign symbol and field definition marks appearing on a bank check. After the numerical character field has been located and the image has been enhanced for reading, the individual characters are located at block 24 for subsequent character recognition. The initial segmentation may be modified for recognition retrials if initial recognition results are unsatisfactory. Each located character is analyzed for the detection of character features to be used in character recognition at block 26. These features are specifically selected for recognizing hand printed numerical characters as described in the above-identified patents.

Character recognition at block 28 is performed by comparing the feature pattern for the unknown character appearing on the document to the previously stored expected feature patterns for hand printed numerical characters. For each unknown input character there will be a character decision and an associated confidence level assigned to indicate the confidence in a correct decision. These character decisions and their associated confidence levels are assembled into a field at block 30. The high confidence character decisions of this field are used in the alphabetical character processing to provide context to the consideration of word alternatives. The number of characters in the numerical character field with the accompanying confidence levels for segmentation and recognition are compared to the number of characters computed from the alphabetical character field recognition at block 20. If the comparison is favorable, the processing proceeds to indicate that the numerical character recognized from the numerical character field has been verified at block 32.

The processing steps involved in recognizing words of the alphabetical character field include analyzing the image of the document to locate the alphabetical character field at block 34. Information utilized to locate the alphabetical character field includes the individual document format definition as well as relative local attributes of the field.

After the alphabetical character field has been located and the image has been enhanced for machine reading, the individual words are located at block 36 for subsequent word recognition.

Each word is analyzed for the detection of word features at block 38 to be used in word recognition. These features will be specialized for the use of recognition of handwritten numerical words and include such features as ascenders, descenders, character stroke tops, character stroke bottoms, crossings, loops, and individual characters. Since there is a limited vocabulary of words appearing in the alphabetical character field, the task of recognizing these words is simplified compared to general recognition of handwriting. The handwritten word phrase amount of the alphabetical character field when coupled with adjacent word decisions will narrow the number of allowable word candidates for recognition. It is also not necessary to specifically recognize the word, but only to know that it is one of a class of words, for example such as the formative "teen".

The feature pattern for the unknown word is compared to previously stored expected feature patterns in the memory of all possible numerical words at block 40. All word patterns that are appropriately similar to the unknown word are recalled from the stored memory as candidate words for a word recognition decision. The word candidates and their associated confidence levels are assembled into a field at block 42. The context of the word candidates, and the syntax of the numerical character field can be used to narrow the selection of word candidates for the legal amount field.

Once the words are assembled into fields at block 42, a numerical equivalent of the words is generated at block 44. The number of characters in the numeric equivalent field generated by block 44 is compared to the number of characters in the numerical character field generated at block 30.

The number of numerical equivalent field characters of the alphabetical character field are compared to the recognition results of the number of characters of the numerical character field at block 20. Each individual character decision of the numerical character field with its associated confidence level is compared to the alphabetical character field for verification using the numerical equivalent field candidate, character and confidence level information that is available from the alphabetical character field recognition. An unfavorable comparison will revert processing to previous stages for retrial or will result in a reject. Those fields passing this verification process will result in low undetected character recognition error rates. Recognition of the handwritten words of the alphabetical character field may be performed in accordance with the above-identified patents Recognition of the handwritten words of the alphabetical character field may also be performed by generating a numerical equivalent field at block 44. The pseudocode for the conversion of the alphabetical field to a numerical equivalent field is as follows:

```
convert_alpha_numer(af,numer_eq)
{
/* Initialize numeric equivalent field (nef) to
   000000000000.00 and placeholder to 3 which is the
   ones place in the dollar portion of amount. */
   for (i = 3; < 15; ++i)
   {
      nef(i) = "0";
   }
   nef(2) = ".";
   nef(1) = "0";
   nef(0) = "0";
   af->num_lists->placeholder = 0;
/* Remove multiple occurrences of the word "and" from
   alphabetical field if they exist to take care of
   occurrences of one hundred and one dollars and ten
   cents. Also, remove extraneous words such as
   dollars, cents, and hundredths. The next step is
   to determine the index of the word "and" which is
   the decimal point. The list, or string, of words
   is then broken into two lists: the first for cents
   and the second for dollars. */
   remove_extran_words(af);
   find_and_index(af);
   break_string(adf, and_index, num_lists);
   af->num_lists->placeholder = 3;
/* Determine the number of words in the alphabetical
   field (af) and put in nel. */
   af->num_list->nel = sizeof(af);
/* Process the dollar portion of the alphabetical
   field */
   process_string(af->num_lists);
   delete_last_sublist(af->num_lists);
/* Now, process the cents portion. */
   word_to_num(af->num_lists, af->num_lists->nel,
   zero);
/* Now that the alphabetical field has been processed,
   copy the values into the numeric equivalent field
   linked list (numer_eq) but not the leading zeros so
   that a direct comparison can be made. */
   i = 14;
   while( nef(i) = 0)
   {
      --i;
   }
   for (j = i; j => 0; --j)
   {
      add_char_numer_eq(nef(j), numer_eq);
   }
return;
process_string(af->num_lists);
{
/* Process the alphabetical field (af) by first
   searching for placeholder modifiers and breaking
   the words into two linked lists for each
   placeholder modifier. A placeholder modifier is
   one of the following words: billion, million,
   thousand, hundred. The alphabetical field is a
   linked list of linked lists. The alphabetical
   recognition will fill in the first list. The
   break_string function will break the list into two
   sublists around the placeholder modifier. The
   first sublist will contain the words to the right
   of the modifier, the current value of nel, and the
   value of the placeholder before the placeholder
   modifier was found. The second sublist will
   contain the words to the left of the placeholder
   modifier, the new value of nel which is the number
   of words in the sublist, and the new value of the
   placeholder value. Since this routine may be
   called recursively, there may be more than two
   lists. Thus, the break_string appends a new
   sublist to the linked list. */
   for (i = 0; i< af->num_lists->nel; ++1)
   {
      if ( af->num_lists->word(i) == "billion")
      {
         new_placeholder = af->num_lists->placeholder + 9;
         break_string(af->num_lists, i);
         af->num_lists->placeholder = new_placeholder;
         process_string(af->num_lists);
         delete_last_sublist(af->num_lists);
         break;
      }
   }
   for (i = 0; i< af->num_lists->nel; ++i)
   {
      if ( af->num_lists->word(i) == "million")
      {
         new_placeholder = af->num_lists->placeholder + 6;
         break_string(af->num_lists, i);
         af->num_lists->placeholder = new_placeholder;
         process_string(af->num_lists);
         delete_last_sublist(af->num_lists);
         break;
      }
   }
   for (i = 0; i< af->num_lists->nel; ++1)
   {
      if ( af->num_lists->word(i) == "thousand")
      {
         new_placeholder = af->num_lists->placeholder + 3;
         break_string(af->num_lists, i);
         af->num_lists->placeholder = new_placeholder;
         process_string(af->num_lists);
         delete_last_sublist(af->num_lists);
         break;
      }
   }
   for (i = 0; i< af->num_lists->nel; ++i)
   {
      if ( af->num_lists->word(i) == "hundred")
      {
         new_placeholder = af->num_lists->placeholder + 2;
         break_string(af->num_lists, i);
         af->num_lists->placeholder = new_placeholder;
         process_string(af->num_lists):
         delete_las_sublist(af->num_lists);
         break;
      }
   }
/* Now, the placeholder modifiers have been found.
   Next, the words are converted to digits. */
   last = 0;
   word_to_num(af->num-lists, af->num_lists->nel,
   last);
   return;
}
word-to-num(af->num_lists, nel, last);
{
/* The numeric equivalent field (nef) is filled in
   with the number digits that correspond to the
   words. */
   for (i = nel; i => last; --i)
   {
      if(nel == 0 && num_lists != first_list)
      {
         nef(af->num_lists->placeholder = "one";
         break;
      }
      if(af->num_lists->word(i) == "ninety")
      {
         nef(af->num_lists->placeholder + 1) = "nine";
      }
      if(af->num_lists->word(i) == "eighty")
      {
         nef(af->num_lists->placeholder + 1) = "eight";
      }
      if(af->num_lists->word(i) == "seventy")
      {
         nef(af->num_lists->placeholder + 1) = "seven";
      }
      if(af->num_lists->word(i) == "sixty")
      {
         nef(af->num_lists->placeholder + 1) = "six";
      }
      if(af->num_lists->word(i) == "fifty")
      {
         nef(af->num_lists->placeholder + 1) = "five";
      }
```

```
                    -continued
if(af->num_lists->word(i) == "forty")
{
    nef(af->num_lists->placeholder + 1) = "four";
}
if(af->num_lists->word(i) == "thirty")
{
    nef(af->num_lists->placeholder + 1) = "three";
}
if(af->num_lists->word(i) == "twenty")
{
    nef(af->num_lists->placeholder + 1) = "two";
}
if(af->num_lists->word(i) == "ten" || af->
num_lists->word(i) == "teen") ||
{
    nef(af->num_lists->placeholder + 1) = "one";
}
if(af->num_lists->word(i) == "twelve")
{
    nef(af->num_lists->placeholder + 1) = "one";
    nef(af->num_lists->placeholder) = "two";
}
if(af->num_lists->word(i) == "eleven")
{
    nef(af->num_lists->placeholder + 1) = "one";
    nef(af->num_lists->placeholder) = "one";
}
if(af->num_lists->word(i) == "nine")
{
    nef(af->num_lists->placeholder) = "nine";
}
if(af->num_lists->word(i) == "eight")
{
    nef(af->num_lists->placeholder) = "eight";
}
if(af->num_lists->word(i) == "seven")
{
    nef(af->num_lists->placeholder) = "seven";
}
if(af->num_lists->word(i) == "six")
{
    nef(af->num_lists->placeholder) = "six";
}
if(af->num_lists->word(i) == "five")
{
    nef(af->num_lists->placeholder) = "five";
}
if(af->num_lists->word(i) == "four")
{
    nef(af->num_lists->placeholder) = "four";
}
if(af->um lists->word(i) == "three")
{
    nef(af->num_lists->placeholder) = "three";
}
if(af->num_lists->word(i) == "two")
{
    nef(af->num_lists->placeholder) = "two;
}
if(af->num_lists->word(i) == "one")
{
    nef(af->num_lists->placeholder) = "one;
}
}
return;
```

The present system 10 may continue to read the alphabetical character field until the system produces a verified numeric result or produces a reject decision because the number of read attempts exceeds a maximum number of attempts predetermined by the system. The comparator 20 may also feedback the answers of both recognition circuits 14 and 16 to recognition circuits 14 and 16, respectively, to aid in a subsequent read attempt.

Therefore it can be seen that the present character recognition system utilizes a redundant recognition and verification of the numerical character field and the alphabetical character field appearing on a document such as, for example, a bank check. The comparison of the recognized word phrase corresponding to the numerical character is utilized for verification of the recognition of the numerical character field appearing on a document.

The present system can also operate to identify alphabetical characters such as words where a numerical character is known, such as for example, where a social security number of person is known, it may be desirable to identify the person's name through an alphabetical character field. In such a system, the numerical character field will generate an alphabetical equivalent field through a database, and a comparison of the number of characters in the alphabetical field will be made at comparator 20 to determine a verified alphanumeric field.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A system for recognizing numerical characters of a numerical field of numerical characters which appears in both numerical characters and words on a document comprising:

image capture means for capturing the image of the document;

first recognition means connected to said image capture means for recognizing each of the numerical characters of the numerical field and for generating a first set of recognition signals representing each of the numerical characters and including:

means for storing feature sets representative of known numerical characters to form a reference data set;

means for storing an image containing a plurality of unknown numerical characters;

means for scanning said image containing said plurality of unknown numerical characters;

means for segmenting said plurality of unknown numerical characters contained in said image;

means for forming feature sets representative of each of said segmented unknown numerical characters; and means for comparing said reference data set with said feature sets of each of said segmented unknown numerical characters;

second recognition means connected to said image capture means for recognizing the words representing the numerical characters and for generating a second set of recognition signals; and means connected to said first and second recognition means for comparing said first and second sets of recognition signals to determine if each of said recognition signals of said first set of recognition signals is correct.

2. The system for recognizing numerical characters of a numerical field of numerical characters of claim 1 where said second recognition means includes:

means for generating a numerical equivalent of the words for use in comparison to each of said recognition signals of said first set of recognition signals.

3. A system for recognizing numerical characters of a numerical field of numerical characters which appears in both numerical characters and words on a document comprising:

image capture means for capturing the image of the document;

first recognition means connected to said image capture means for recognizing each of the numerical characters of the numerical field and for generating a first set of recognition signals representing each of the numerical characters;

second recognition means connected to said image capture means for recognizing the words representing the numerical characters and for generating a second set of recognition signals and including:

means for storing feature sets representative of the known words to form a reference data set;

means for storing an image containing a plurality of unknown words;

means for segmenting said plurality of unknown words contained in said image;

means for forming feature sets representative of each of said segmented unknown words; and means for comparing said reference data set with said feature sets of each of said segmented unknown words; and means connected to said first and second recognition means for comprising said first and second sets of recognition signals to determine if each of said recognition signals of said first set of recognition signals is correct.

4. The system for recognizing numerical characters of a numerical field of numerical characters of claim 3 where said second recognition means further includes:

means for generating a numerical equivalent of the words for use in comparison to each of said recognition signals of said first set of recognition signals.

5. A system for recognizing words having an associated numerical field of numerical characters which appear on a document comprising:

image capture means for capturing the image of the document;

first recognition means connected to said image capture means for recognizing each of the words and for generating a first set of recognition signals representing each of the words and including:

means for storing feature sets representative of the known words to form a reference data set;

means for storing an image containing a plurality of unknown words;

means for scanning said image containing said plurality of unknown words;

means for segmenting said plurality of unknown words contained in said image;

means for forming feature sets representative of each of said segmented unknown words; and means for comparing said reference data set with said feature sets of each of said segmented unknown words;

second recognition means connected to said image capture means for recognizing the numerical characters associated with the words and for generating a second set of recognition signals; and means connected to said first and second recognition means for comparing said first and second sets of recognition signals to determine if each of said recognition signals of said first set of recognition signals is correct.

6. The system for recognizing means further includes;

means for generating a numerical equivalent of the words for use in comparison of said first and second sets of recognition signals.

7. A system for recognizing words having an associated numerical field of numerical characters which appear on a document comprising:

image capture means for capturing the image of the document;

first recognition means connected to said image capture means for recognizing each of the words and for generating a first set of recognition signals representing each of the words;

second recognition means connected to said image capture means for recognizing the numerical characters associated with the words and for generating a second set of recognition signals and including:

means for storing feature sets representative of know numerical characters to form a reference data set;

means for storing an image containing a plurality of unknown numerical characters;

means for scanning said image containing said plurality of unknown numerical characters;

means for segmenting said plurality of unknown numerical characters contained in said image;

means for forming feature sets representative of each of said segmented unknown numerical characters; and means for comparing said reference data set with said feature sets of each said segmented unknown numerical characters; and means connected to said first and second recognition means for comparing said first and second sets of recognition signals to determine if each of said recognition signals of said first set of recognition signals is correct.

8. The system for recognizing words of claim 7 wherein said first recognition means further includes:

means for generating a numerical equivalent of the words for use in comparison of said first and second sets of recognition signals.

* * * * *

UNITED STATES PATENT AND TRADEMARK OFFICE
CERTIFICATE OF CORRECTION

PATENT NO. : 5,146,512
DATED : SEPTEMBER 8, 1992
INVENTOR(S) : WILLIAM E. WEIDEMAN, ET AL.

It is certified that error appears in the above-identified patent and that said Letters Patent is hereby corrected as shown below:

Column 6, line 34, delete "las" and insert -- last --.

Column 9, following line 15, insert -- means for scanning said image containing said plurality of unknown words; --

Column 9, line 24, delete "comprising" and insert -- comparing --.

Column 10, line 13, following "recognizing" insert -- words of claim 5 wherein said first recognition --.

Signed and Sealed this

Nineteenth Day of October, 1993

Attest:

BRUCE LEHMAN

Attesting Officer  Commissioner of Patents and Trademarks

(12) EX PARTE REEXAMINATION CERTIFICATE (4916th)
United States Patent
Weideman et al.

(10) Number: US 5,146,512 C1
(45) Certificate Issued: Mar. 9, 2004

(54) METHOD AND APPARATUS FOR UTILIZING MULTIPLE DATA FIELDS FOR CHARACTER RECOGNITION

(75) Inventors: William E. Weideman, Arlington, TX (US); Carl G. O'Connor, Arlington, VA (US)

(73) Assignee: Bantec, Inc., Dallas, TX (US)

Reexamination Request:
No. 90/005,981, Apr. 17, 2001
No. 90/006,065, Jul. 20, 2001

Reexamination Certificate for:
Patent No.: 5,146,512
Issued: Sep. 8, 1992
Appl. No.: 07/655,085
Filed: Feb. 14, 1991

Certificate of Correction issued Oct. 19, 1993.

(51) Int. Cl.⁷ .................................................. G06K 9/62
(52) U.S. Cl. ...................................... 382/218; 382/137
(58) Field of Search .................................. 382/135, 137, 382/138, 139, 140, 209, 218, 229, 282; 235/379, 454

(56) References Cited

U.S. PATENT DOCUMENTS 3,842,402 A  10/1974  Ett et al. .................. 340/146.3
4,481,665 A  11/1984  Ota .............................. 382/48
4,562,594 A  12/1985  Bednar et al. ................. 382/9
5,031,223 A   7/1991  Rosenbaum et al. ........... 382/1

OTHER PUBLICATIONS

Excerpt from the printed publication Advanced Development Model of Advanced Optical Character Reader,: vol. 1, Technical Proposal, May 8, 1970, Recognition Equipment Inc., pp. 4–120 through 4–129.

"The Advanced Optical Character Reader System," Jerry D. Erwin, Recognition Equipment Inc., First United States—Japan Computer Conference, 1972, pp. 49–54.

Declaration of Jerry D. Erwin.

Primary Examiner—Phuoc Tran

(57) ABSTRACT

A system (10) for recognizing numerical characters which appear as both numerical characters and words on a document includes an image capture device (12) for capturing the image of a document. A recognition circuit (14) performs recognition of the numerical characters. A recognition circuit (16) performs recognition of the words corresponding to the numerical characters. A comparator circuit (20) compares the recognition signals generated by the recognition circuit (16) to the recognition signals generated by the recognition circuit (14) to determine if the numerical characters recognized by the recognition circuit (14) is correct.

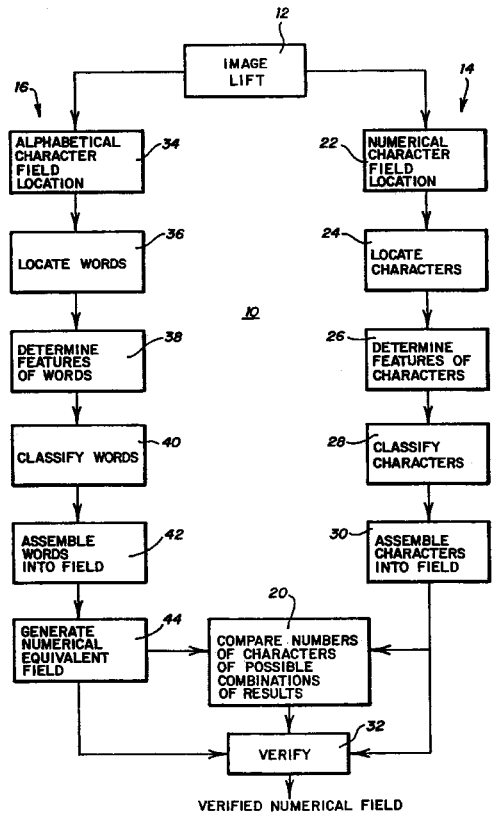

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *